Figure 1:
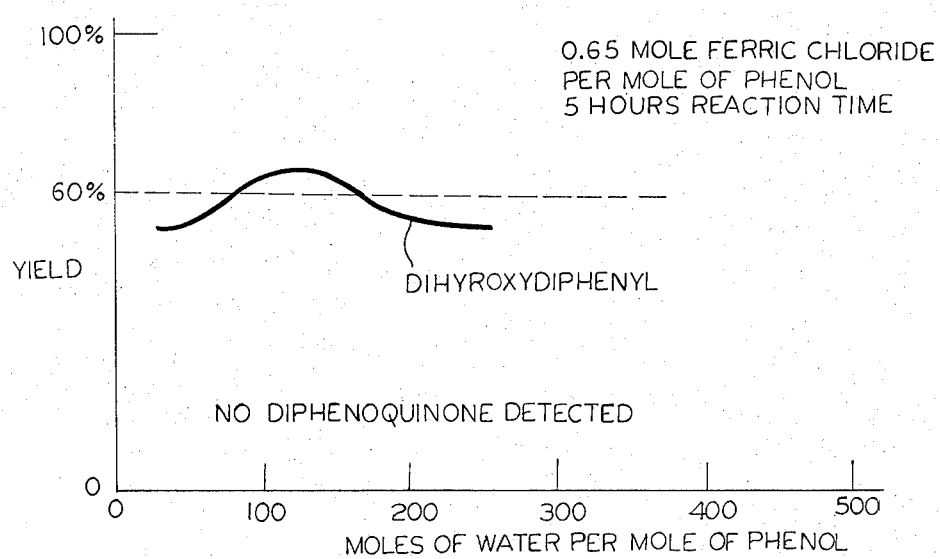

May 21, 1974  D. R. RANDELL ET AL  3,812,193

PREPARATION OF 3,3',5,5'-TETRA-ISOPROPYL-4,4'-HYDROXYDIPHENYL

Filed Aug. 9, 1971  7 Sheets-Sheet 1

INVENTORS
DONALD RICHARD RANDELL
PETER MILES
ALLAN GEOFFREY VIRGIN

BY *Wenderoth, Lind & Ponack*
ATTORNEYS

United States Patent Office 3,812,193
Patented May 21, 1974

3,812,193
PREPARATION OF 3,3',5,5'-TETRA-ISOPROPYL-4,4'-HYDROXYDIPHENYL
Donald Richard Randell, Stockport, and Peter Miles and Allan Geoffrey Virgin, Manchester, England, assignors to Ciba-Geigy AG, Basel, Switzerland
Filed Aug. 9, 1971, Ser. No. 170,243
Claims priority, application Great Britain, Aug. 8, 1970, 38,316/70
Int. Cl. C07c 37/00
U.S. Cl. 260—620    4 Claims

ABSTRACT OF THE DISCLOSURE 3,3',5,5'-tetra-isopropyl - 4,4' - dihydroxydiphenyl is prepared by oxidizing 2,6-di-isopropyl phenol with a ferric salt of a nonoxidizing acid. The compound is used as a stabilizer for gasoline.

---

Processes which have been used in the past for the preparation of 3,3',5,5'-tetraalkyl 4,4'-dihydroxydiphenyls have generally been two-stage processes, involving oxidation of a 2,6 dialkyl phenol to the corresponding diphenoquinone, and then reduction of the diphenoquinone (often after isolation and purification) to 3,3',5,5'-tetraalkyl 4,4'-dihydroxydiphenyl. The first stage may be effected by air-blowing in the presence of a complex catalyst system, or by the use of strong oxidizing agents such as chromic acid; the subsequent reduction may be carried out with nascent hydrogen. Yields of the 3,3',5,5'-tetraalkyl 4,4'-dihydroxydiphenyl are dependent on the substituents present in the original phenol, and, if methyl or ethyl groups are present, polymeric products often result.

The specification of the British Pat. No. 806,534 describes a such two-stage process for the preparation of 3,3',5,5'-tetraalkyl 4,4' - dihydroxydiphenyls which comprises the oxidation of a 2,6-dialkyl phenol with one of a number of oxidizing agents, followed by reduction of the diphenoquinone produced with one of a number of reducing agents. In Example 1 of this specification, the ratio of ferric chloride oxidizing agent to 2,6 di-isopropyl phenol in the first stage is 1.32:1 molar, and the ratio of water to 2,6 di-isopropyl phenol is about 500:1 molar; the yield of diphenoquinone actually recovered is about 40%, though the yield of crude material would have been much higher, possibly 60%. Subsequently, the diphenoquinone is reduced to 3,3',5,5'-tetraisopropyl 4,4'-dihydroxydiphenyl. We have now surprisingly found that if we do not follow this example, but use different ratios of ferric chloride to phenol and of water to phenol, correlating the ratios suitably, the first stage of the process claimed can itself result in very good yield of the substituted 4,4'-dihydroxydiphenyl, not of the diphenoquinone, and there is no need for a second stage of reduction.

According to the invention, therefore, we prepare 3,3', 5,5' - tetra-isopropyl-4,4'-dihydroxydiphenyl by a single-stage process which comprises oxidizing 2,6-di-isopropyl phenol with a ferric salt of a non-oxidizing acid in an aqueous medium, the ratio of ferric iron in the ferric salt to phenol being from 0.65 to 3.0:1 atoms per mole and the ratio of water to phenol being up to 500:1 molar, the actual ratios used being so selected and correlated and the time of reaction being such that the yield of dihydroxy diphenyl is at least 60% calculated on the phenol starting material, and recovering the dihydroxy diphenyl from the reaction mixture. The 3,3',5,5'-tetra-isopropyl-4,4'-dihydroxydiphenyl is used as a gasoline stabilizer.

The ratio of ferric iron in the ferric salt to phenol will lie between the broad limits of 0.65:1 and 3.0:1 atoms per mole; within these broad limits the best ratio will not be the same for all ferric salts, for example that for ferric chloride in any given circumstances may differ from that for ferric sulphate.

We have found that in most cases it is preferable for the ratio of water to phenol to be considerably less than 500:1 molar, although good yields can be obtained with some ratios of ferric chloride to phenol if the ratio of water to phenol is as high as 500:1 molar. In general we prefer to use a ratio of ferric iron in the ferric salt to phenol of from 0.75 to 1.5:1 atoms per mole, and proportions of about 1:1 are very satisfactory both from a technical and a commercial point of view.

Once the process according to the invention has been carried out, and the desired yield of at least 60% of the 4,4'-dihydroxydiphenyl obtained, the diphenoquinone side product itself may be then reduced to the substituted 4,4'-dihydroxydiphenyl in conventional manner, for example using sodium sulphide, which will improve the overall yield.

Ferric salts which may be used include ferric chloride and its complexes, ferric sulphate, ferric phosphate, ferric sulphide, ferric citrate, ferric oxalate, ferric ammonium sulphate, ferric thiocyanate and ferric bromide. The ferric salt as such may be used, or may be generated in situ in the reaction mixture, for instance from ferric oxide and hydrochloric acid. In the general category of ferric salts of non-oxidizing acids, we include ferric hydroxide; ferric nitrate, ferric persulphate, ferric chlorate, ferric perchlorate and ferric perborate, for example, are excluded since these are salts of oxidizing acids.

The process according to the invention is applicable to pure 2,6-di-isopropyl phenol. It is also applicable to mixtures containing 2,6-di-isopropyl phenol which arise from the alkylation of phenol with propylene, in which there may also be present 2,4-di-isopropyl phenol, 2,5-di-isopropyl phenol, 2,4,6-tri-isopropyl phenol, o-, m- and p-isopropyl phenols and phenol itself, and to mixtures of 2,6-di-isopropyl phenol with other phenols such as ethylated, sec- and t-butylated phenols and cresols. It is unexpectedly found that this coupling of the phenol starting material by the process according to the invention is apparently specific to 2,6-di-isopropyl phenol itself, and does not occur, for example, with phenol or with 2,6-di-t-butyl phenol.

A very satisfactory procedure for the process according to the invention is in general terms as follows. Ferric oxide, 2,6-di-isopropyl phenol and water in the necessary proportions are charged into a reactor, heated to reflux, and hydrochloric acid then added dropwise. Refluxing with stirring is continued for the desired period of time (5 hours or 12 hours in the Examples to be given), the reaction mixture is then cooled, and diluted with toluene; after separation, the acidic aqueous layer is discarded, and the organic layer is washed four times with water and filtered. The solvent is then evaporated under reduced pressure from the filtrate, to give the required 3,3',5,5'-tetra-isopropyl-4,4'-dihydroxydiphenyl.

A number of test runs were carried out using this procedure on pure 2,6-di-isopropyl phenol, and the results obtained are given in the following table:

TABLE

| Moles FeCl$_3$ per mole phenol | Moles H$_2$O per mole phenol | Yield after 5 hours reaction time, percent | | Yield after 12 hours reaction time, percent | |
|---|---|---|---|---|---|
| | | Dihydroxydiphenyl | Diphenoquinone | Dihydroxydiphenyl | Diphenoquinone |
| 0.5 | 63 | 46 | 2 | 46 | 0 |
| 0.65 | 26.1 | 50 | 0 | 55 | 0 |
| | 63.9 | 54 | 0 | 67 | 0 |
| | 92.9 | 65 | 0 | 47 | 0 |
| | 226 | 55 | 0 | 52 | 0 |
| 0.75 | 64.5 | 67 | 0 | 63 | 0 |
| | 79 | 80 | 2 | 84 | 0 |
| | 93.5 | 80 | 2 | 79 | 0 |
| | 227 | 68 | 2 | 68 | 0 |
| | 560 | 63 | 5 | 62 | 2 |
| 1.0 | 0 | 26 | 0 | 52 | 0 |
| | 17.1 | 40 | 0 | 46 | 0 |
| | 39.3 | 86 | 0 | 86 | 0 |
| | 66 | 82 | 4 | 100 | 0 |
| | 95 | 74.5 | 4.5 | 90 | 0 |
| | 228 | 70 | 8.5 | 75 | 2.5 |
| | 562 | 71 | 8.5 | 74 | 2 |
| 1.5 | 31.2 | 97 | 0 | 60 | 0 |
| | 69 | 77 | 12 | 88 | 1 |
| | 98 | 62 | 27 | 81 | 8 |
| | 231 | 60 | 30 | 73 | 21 |
| 2.0 | 72 | 88 | 6 | 91 | 1.5 |
| | 86.5 | 69 | 21 | 96 | 4 |
| | 101 | 60 | 40 | 85 | 15 |
| | 234 | 20 | 80 | 20 | 80 |
| | 568 | 10 | 90 | 10 | 90 |
| 2.5 | 37.2 | 50 | 4 | 56 | 0 |
| | 48.3 | 60 | 0 | 66 | 0 |
| | 75 | 70 | 7 | 77 | 2 |
| | 104 | 57 | 38 | 65 | 6 |
| | 237 | 18 | 73 | 7 | 86 |
| 3.0 | 78 | 67 | 10 | 74 | 5 |
| | 92.5 | 72 | 4 | 73 | 4 |
| | 107 | 34 | 50 | 66 | 12 |
| | 240 | 26 | 58 | 17 | 79 |
| | 574 | 19 | 75 | 2 | 95 |

As may be seen, the yields are dependent on the time of reaction, and this may be selected as desired to obtain the best yield at any given ratios of reactants.

Figure 2:
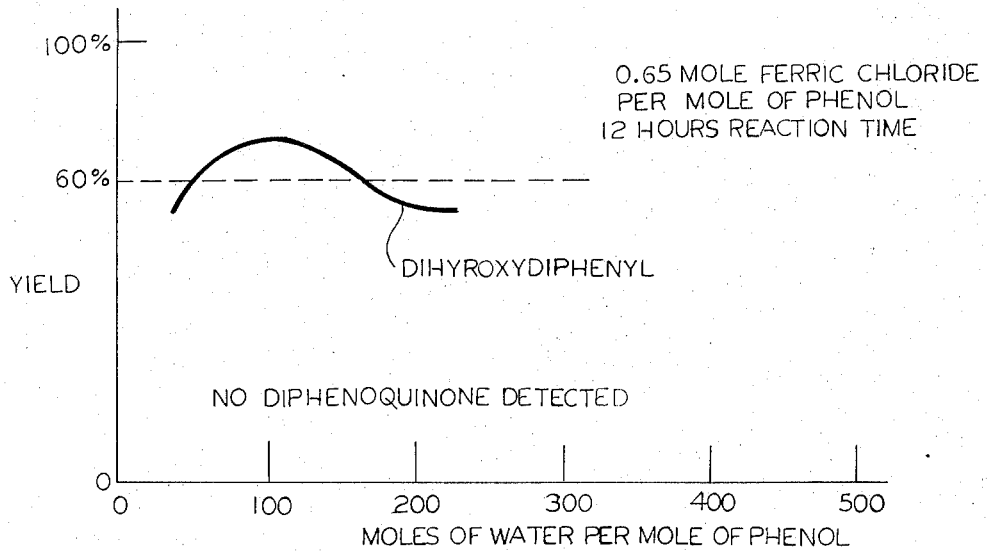
Figure 3:
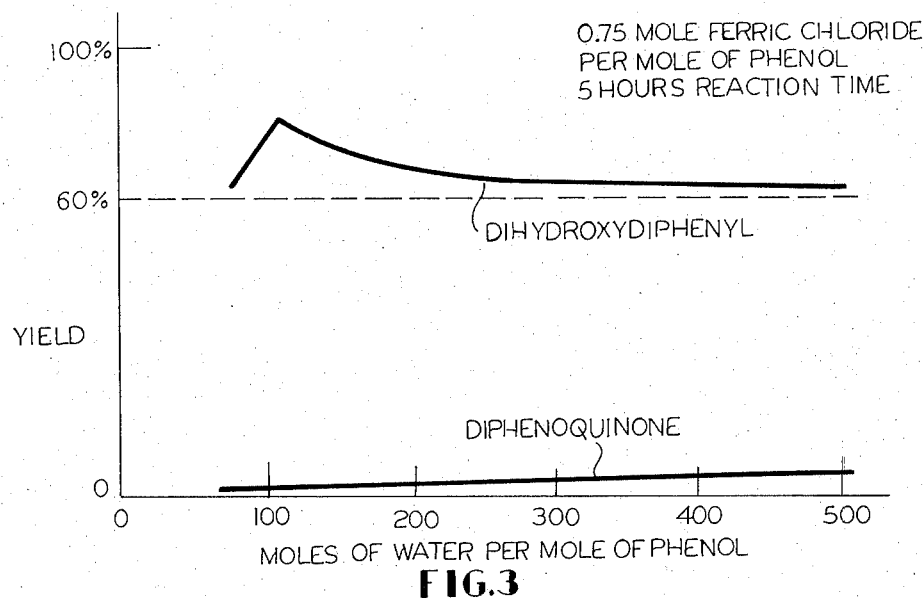
Figure 4:
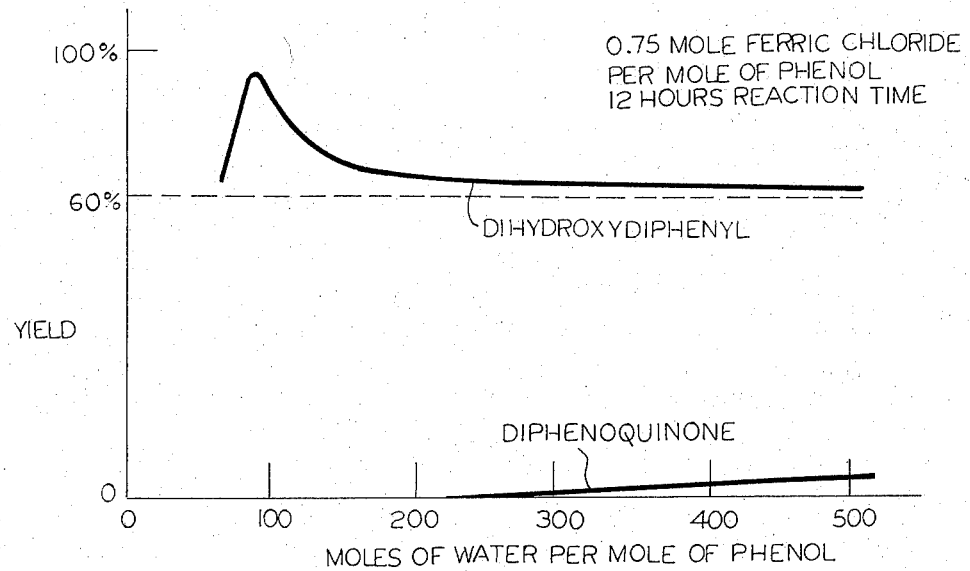
Figure 5:
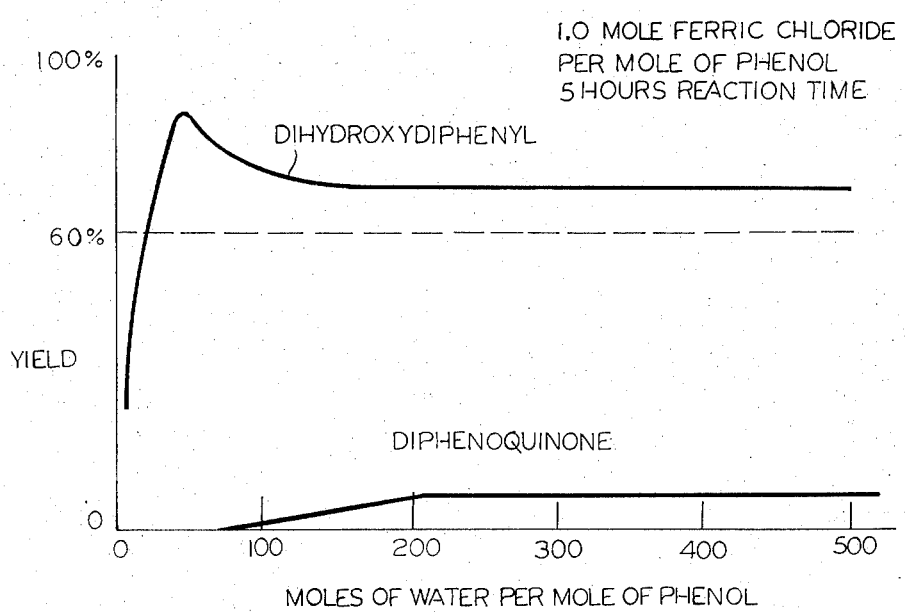
Figure 6:
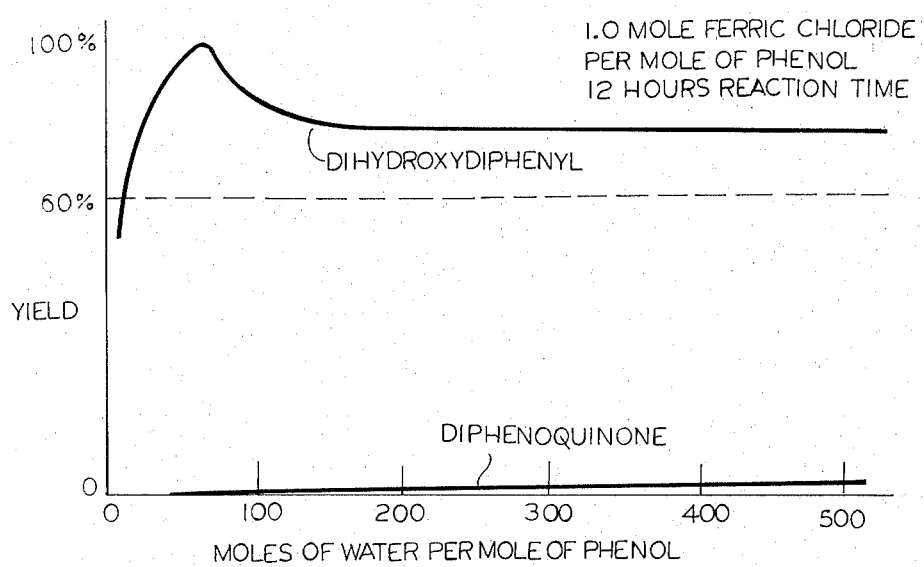
Figure 7:
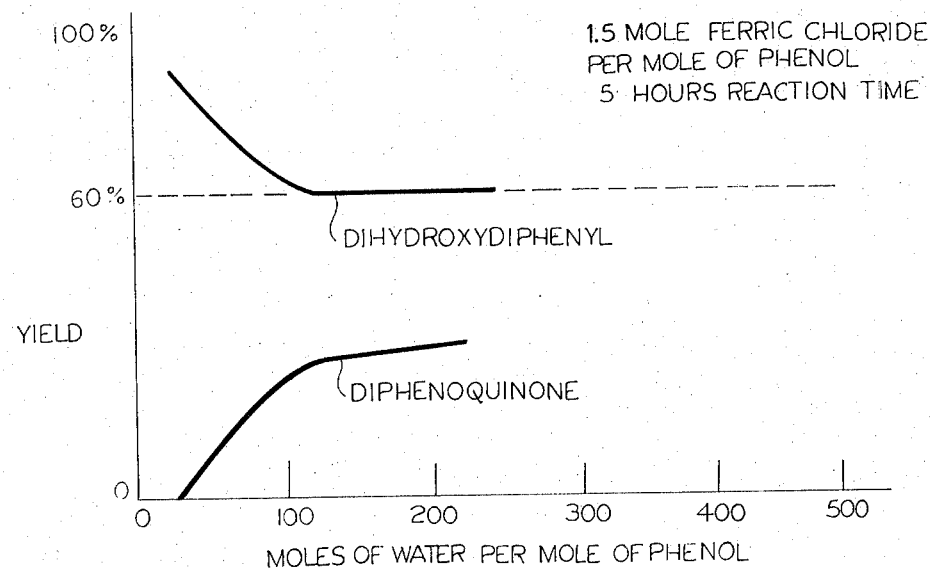
Figure 8:
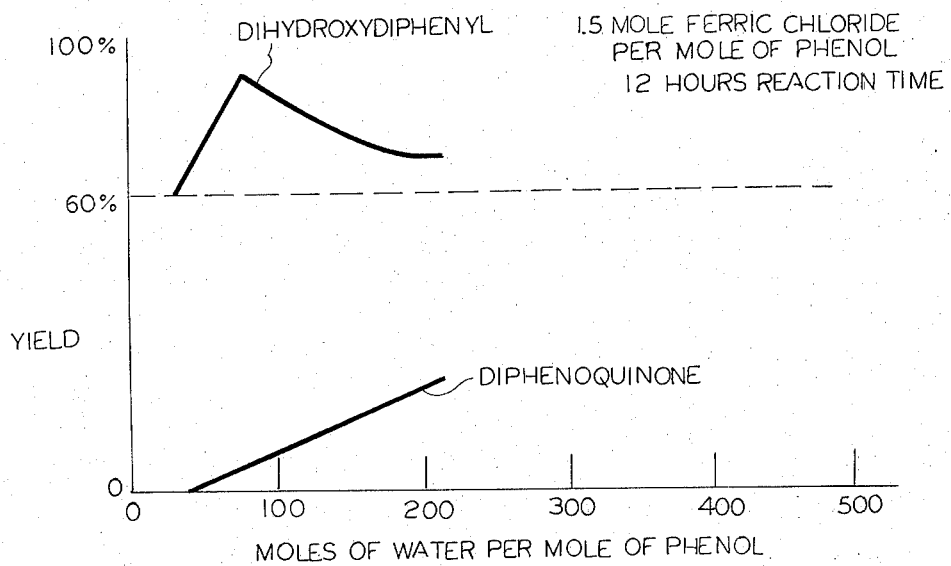
Figure 9:
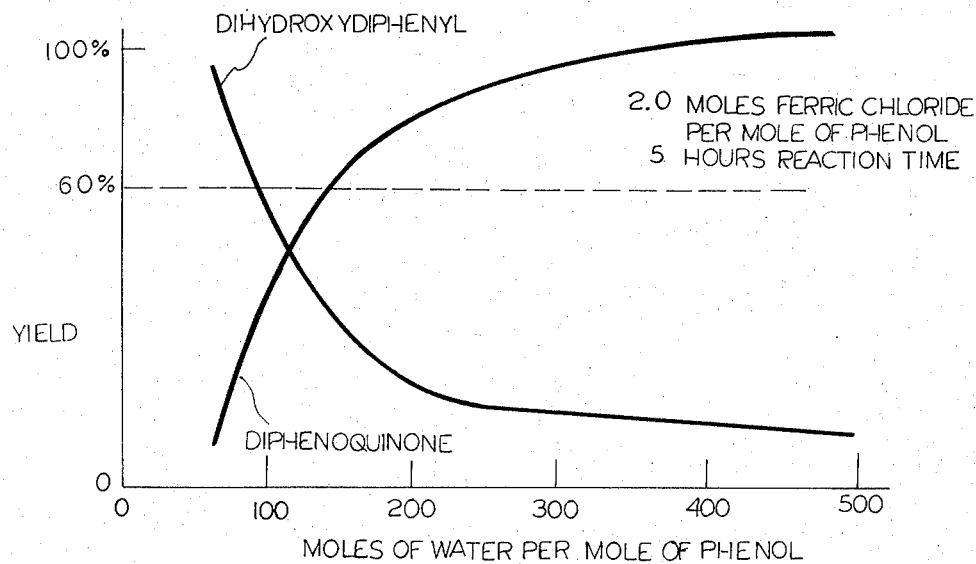
Figure 10:
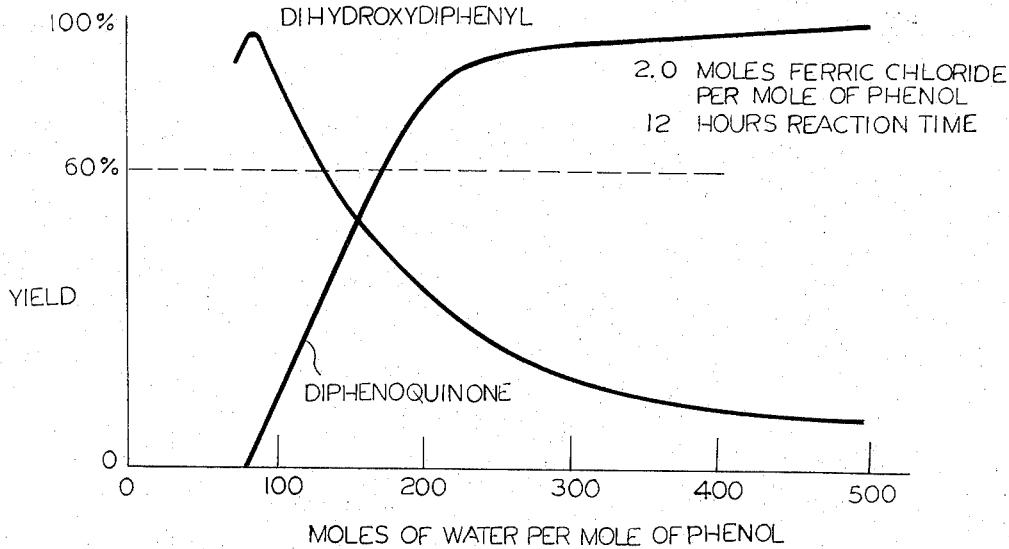
Figure 11:
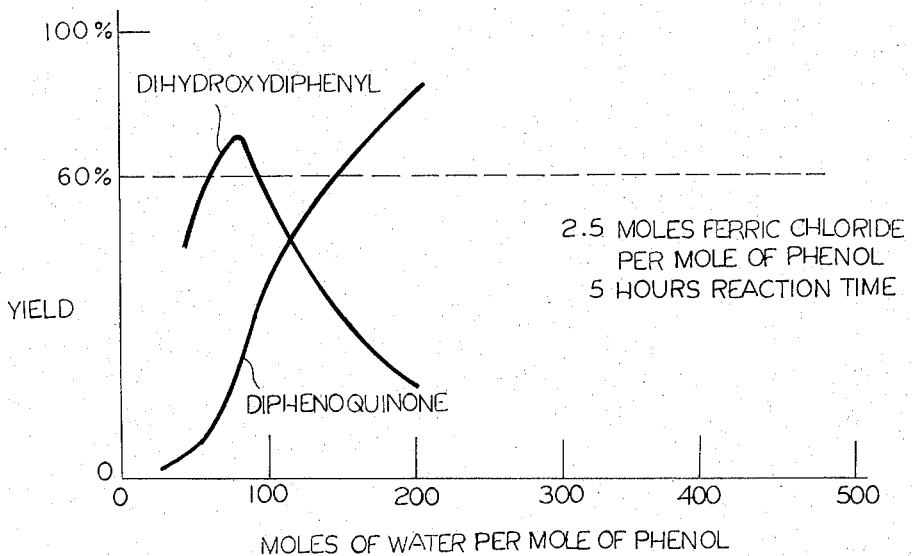
Figure 12:
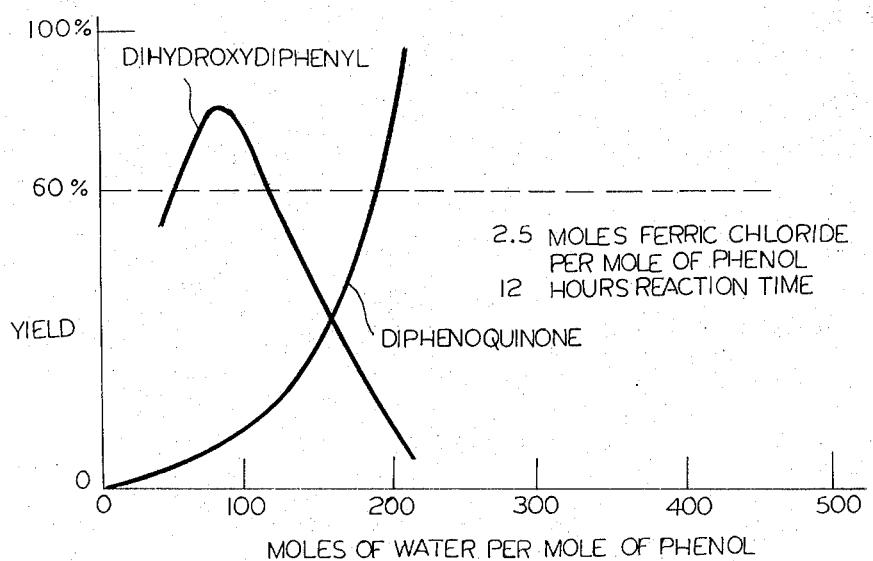
Figure 13:
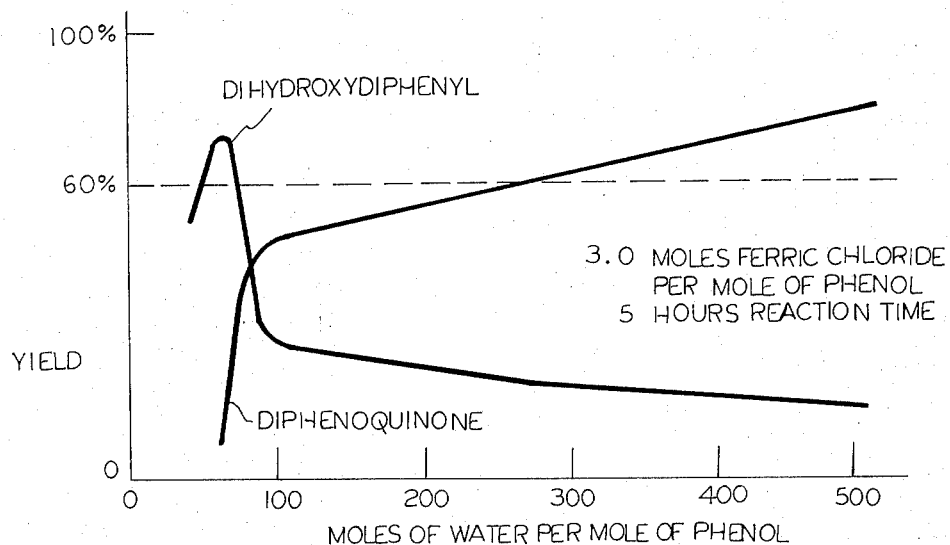
Figure 14:
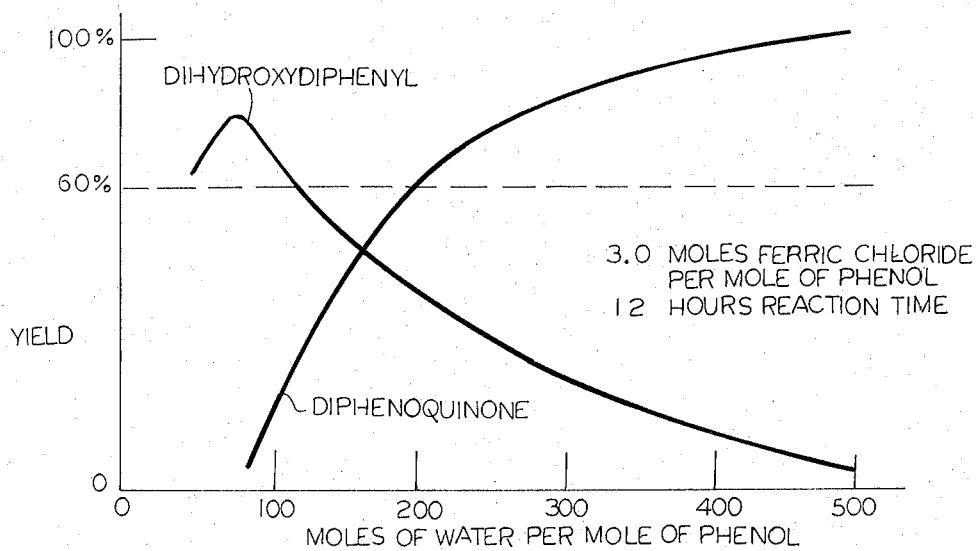

It is clear from these test runs that there is in every case an optimum range of ratios of water to phenol for each value of the ratio of ferric chloride to phenol to give the highest yield of 4,4'-dihydroxydiphenyl product. Graphs forming FIGS. 1–14 show clearly when the yield of 4,4'-dihydroxydiphenyl product falls below the desirable level of 60%; in each graph it can be envisaged that there is a peak of yield, and clearly it is preferred to work at or near the apex of the graph, all other factors being equal. It is clear from these test runs that when utilizing a ratio of 0.75 to 1.5 moles FeCl$_3$ per mole of phenol, it is desirable to utilize 31.2 to 562 moles H$_2$O per mole of phenol. In some situations it can be seen that essentially 100% yield of dihydroxy diphenyl can be obtained, with no detectable production of diphenoquinone, for example at about 66 moles of water per mole of phenol and an equimolar ratio of ferric chloride and phenol. To demonstrate the way in which the process according to the invention is apparently specific to 2,6-di-isopropyl phenol, this reaction giving 100% yield of 3,3',5,5'-tetraisopropyl-4,4'-dihydroxy diphenyl was repeated with the substitution of 2,6-di-t-butyl phenol for the 2,6-di-isopropyl phenol. The product obtained gave the following N.M.R. analysis:

| | Percent |
|---|---|
| 3,3',5,5'-tetra-t-butyl-4,4'-dihydroxydiphenyl | 11 |
| 3,3',5,5'-tetra-t-butyl-diphenoquinone | 25 |
| Unreacted 2,6-di-t-butyl phenol | 64 | the desired dihydroxydiphenyl thus constituting only 11% of the product.

Although the process appears to be specific to the coupling of 2,6-di-isopropyl phenol, it can be applied successfully to mixtures containing this phenol. One such phenol mixture had the following constitution, as determined by GLC analysis:

| | Percent |
|---|---|
| Phenol | 3.2 |
| o-Isopropyl phenol | 8.1 |
| m/p Isopropyl phenol | 0.9 |
| 2,6-di-isopropyl phenol | 60.9 |
| 2,4-di-isopropyl phenol | 1.4 |
| 2,4,6-tri-isopropyl phenol | 25.5 | these percentages being by weight. The following example of the invention, Example 1, was carried out using this mixture of phenols, all parts and percentages again being by weight unless otherwise stated:

EXAMPLE 1

23.3 parts of ferric oxide (0.125 mole, based on an assay of 85.8%), 71.4 parts of the mixture of phenols (0.25 mole, based on molecular weight calculated from N.M.R. analysis) and 164 parts water (9.1 mole) were charged into a 250 ml. multi-necked reactor equipped with stirrer, thermometer pocket, reflux condenser and dropping funnel. The ratio of ferric salt to phenol was thus 1:1, and of water to phenol 36.5:1.

The contents of the flask were heated to reflux, and, after 10 minutes, 59.8 parts of concentrated hydrochloric acid (0.5 mole) were added dropwise. After refluxing for stirring for a further 5 hours, the reaction mixture was cooled, 50 parts of toluene were added and the mixture then stirred for 15 minutes, before being transferred to a separating flask and the aqueous layer discarded. The organic layer was washed four times with 50 part portions of water, filtered through paper, and the solvent evaporated from the filtrate under reduced pressure to leave 67.8 parts of a dark brown liquid which solidified on standing. This product had the following analysis:

| Compound | Method of N.M.R., percent | Analysis G.L.C., percent |
|---|---|---|
| 3,3',5,5'-tetra-isopropyl-4,4'-dihydroxy diphenyl | 45 | 42 |
| 3,6-di-isopropyl phenol | 14 | 16 |
| 2,4,6-tri-isopropyl phenol | 25 | 26 |
| 3',5,5'-tetra-isopropyl diphenoquinone | (1) | Trace |
| Unknown | 16 | 16 |

[1] None detected.

Three further Examples will now be given:

EXAMPLE 2

Pure 2,6-di-isopropyl phenol (7.2 parts) (0.04 mole), ferric citrate (19.95 parts) (0.06 mole) and water (42.8 parts) were charged to a reaction vessel and refluxed with vigorous stirring for 24 hours. After cooling to room temperature, toluene (60 parts by volume) was added and the mixture stirred for 5 minutes. The mixture was allowed to stand and the aqueous phase discarded. The toluene layer was washed three times with 100 parts of water. The toluene was then removed under vacuum to yield 7 parts of a dark brown viscous oil which crystallized on cooling. The product contained 99% 3,3',5,5'-tetraisopropyl-4,4'-dihydroxydiphenyl with trace amounts of impurities by quantitative NMR.

EXAMPLE 3

Pure 2,6-di-isopropyl phenol (9.1 parts) (0.05 mole), ferric ammonium sulphate (48.22 parts) (0.05 mole) and water (54 parts) were charged to a reaction vessel. The mixture was refluxed and the product recovered as in Example 1 to yield 9 parts of a brown viscous liquid which crystallized on standing. This product contained 64% 3,3',5,5'-tetra-isopropyl-4,4'-dihydroxydiphenyl by quantitative NMR.

EXAMPLE 4

To 20 parts (0.11 mole) of 2,6-di-isopropyl phenol were added 22.7 parts (0.057 mole) ferric sulphate in 31.4 parts of water containing 5.5 parts of concentrated sulphuric acid over 1 hour at 90° C. The mixture was subsequently stirred for a further 14 hours at 90° C. The product was isolated by adding toluene, washing four times with water and stripping to remove the toluene. In this manner were obtained 19.4 parts of product having the following analysis (by G.L.C.):

| | Percent |
|---|---|
| 3,3',5,5' - tetra - isopropyl-4,4'-dihydroxydiphenyl | 65.7 |
| 2,6-di-isopropyl phenol | 31.2 |
| Unknown | 3.1 |

What we claim is:

1. A single stage process for the preparation of 3,3',5,5'-tetra - isopropyl - 4,4' - dihyroxydiphenyl which comprises oxidizing 2,6-diisopropyl phenol with a ferric salt selected from the group of ferric chloride, a ferric chloride complex, ferric sulphate, ferric phosphate, ferric sulphide, ferric citrate, ferric oxalate, ferric ammonium sulphate, ferric thiocyanate and ferric bromide in an aqueous medium the ratio of ferric iron in the ferric salt to phenol being from 0.75 to 1.5:1 atoms per mole and the ratio of water to phenol being 31.2 to 562:1 and recovering the dihydroxydiphenyl from the reaction mixture.

2. A process according to claim 1 in which the ratio of ferric iron in the ferric salt to phenol is about 1:1.

3. A process according to claim 1 in which the ferric salt is generated in situ in the reaction mixture.

4. A process according to claim 1, applied to a mixture containing 2,6-di-isopropyl phenol formed by the alkylation of phenol with propylene.

References Cited

UNITED STATES PATENTS

| 2,900,417 | 8/1959 | Filbey et al. | 260—620 |
| 2,057,676 | 10/1936 | Graves | 260—620 X |

LEON ZITVER, Primary Examiner

N. MORGENSTERN, Assistant Examiner

U.S. Cl. X.R.

260—396 R, 626 R